(12) United States Patent
Ballou

(10) Patent No.: US 9,223,310 B2
(45) Date of Patent: Dec. 29, 2015

(54) SHIP COURSE OBSTRUCTION WARNING TRANSPORT

(71) Applicant: The Boeing Company, Seal Beach, CA (US)

(72) Inventor: Philip J. Ballou, Alameda, CA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 13/763,126

(22) Filed: Feb. 8, 2013

(65) Prior Publication Data

US 2015/0277442 A1 Oct. 1, 2015

(51) Int. Cl.
| | |
|---|---|
| *B63B 35/00* | (2006.01) |
| *B63H 25/04* | (2006.01) |
| *G05D 1/02* | (2006.01) |
| *G01S 15/89* | (2006.01) |
| *G05D 1/00* | (2006.01) |

(52) U.S. Cl.
CPC .............. *G05D 1/0206* (2013.01); *B63B 35/00* (2013.01); *B63H 25/04* (2013.01); *G01S 15/89* (2013.01); *G05D 1/0027* (2013.01); *B63B 2035/007* (2013.01); *B63B 2035/008* (2013.01); *B63H 2025/045* (2013.01)

(58) Field of Classification Search
CPC ........ B63B 35/00; B63B 43/18; B63H 25/04; G05D 1/02; G05D 1/0206; G01S 15/89
USPC .............. 114/144 R; 367/88, 99, 104; 701/21
See application file for complete search history.

(56) References Cited

U.S. PATENT DOCUMENTS 5,321,667 A * 6/1994 Audi et al. ...................... 367/88
5,689,475 A 11/1997 Chaumet-Lagrange

FOREIGN PATENT DOCUMENTS

CN 202966599 U 6/2013
WO 2005012079 A1 2/2005

OTHER PUBLICATIONS

Combined Search and Examination Report of Application No. GB1401821.2; Jul. 21, 2014; 5 pages.
Pending U.S. Appl. No. 13/683,846, filed Nov. 21, 2012.
Unmanned WAM-V; http://www.wam-v.com/unmanned.html; retrieved from Internet Feb. 8, 2013; 4 pages; Marine Advanced Research, Inc.

* cited by examiner

*Primary Examiner* — Lars A Olson
(74) *Attorney, Agent, or Firm* — Armstrong Teasdale LLP

(57) ABSTRACT

An unmanned aquatic surface vehicle for detecting and locating hazards is disclosed. The vehicle includes a propulsion system configured to impart a propulsive force to the vehicle and a steering system configured to impart a change in the direction of travel of the vehicle. A navigation system may be included to detect the location, direction, and motion of the vehicle. A hazard detection system is configured to detect and locate at least one of a subsurface, surface or above-water hazard. A communications device configured to transmit hazard data associated with a detected hazard to a remote receiver. A control station is able to control the vehicle, and receive and display information about hazards detected by the unmanned aquatic surface vehicle.

19 Claims, 6 Drawing Sheets

SHIP COURSE OBSTRUCTION WARNING TRANSPORT

FIELD

The field of the disclosure generally relates to systems and methods for navigation and hazard avoidance. More particularly, the disclosure relates to remote vehicles operable to provide information relating to navigation and hazard avoidance.

BACKGROUND

Large waterborne vehicles, such as cruise ships, cargo ships, military vessels, and the like are difficult and slow to maneuver. Narrow passageways and restricted waters can exacerbate the maneuvering difficulties by restricting the operable or navigable area of the vessel. In some instances, large ships may take up to several kilometers (i.e., a nautical mile or more) in order to complete a turn or come to a stop. Due to these difficulties in maneuvering such large ships, every year many ships run aground or make contact with hazards, which cause damage to the ship. In some cases, the ship, crew and cargo may all be lost if the ship sinks. In other instances, damage to the ship may cause environmental damage, such as oil spills or other pollutants being released to the air, land and water.

Further, in developing countries, waterways such as ports, harbors and rivers may be poorly maintained for large ship travel. For example, surveying and dredging is sporadic, and currents, tides and waves can cause rapid changes in the bottom contours of the waterways due to sedimentation and moving sandbars. Despite such conditions, many large ships still frequently travel on these poorly maintained waterways. As such, these ships may run aground or make contact with the bottom of the waterways, which causes damage to the ships and risks environmental destruction.

Some waterways such as bays, fjords, deltas, and rivers, are prone to transient local currents and eddies, and gusting wind. These can cause large ships to be driven off course, thereby running aground or into other hazards or obstructions.

In other areas, marine life is also a concern for ship traffic. For example, in some areas, endangered species, sleeping or nursing whales and the like may be injured or killed if they are run into by a ship. Further, impacts with such large marine mammals may cause damage to the ship.

In order to avoid collisions, ships typically rely on navigation charts to set up routes to avoid hazards and stay in waters deep enough for the ship's required draft. However, in many instances, the data on the navigation chart is inaccurate, incomplete or non-existent, thus requiring ships to enter some areas with extreme caution (e.g., excessive slowing of the ship's speed). Excessive slowing of the ship's speed may further reduce the maneuverability of the ship, and make the ship more vulnerable to attacks, such as by pirates.

In major ports, large ships are typically greeted outside the port by a local pilot who boards the ship and takes control for navigation and docking in the port. In some locations, the navigation and docking are further assisted by local tugboat operators. However, at many smaller ports, such assistance is not available and the ship's pilot must navigate and dock the ship without assistance. Such is often the case for restricted waters not associated with a major port, such as coastal areas, lakes, rivers and channels between islands. In order to navigate in these areas, most ships measure water depth directly below it using an echo sounder. However, few ships are equipped with any device that can measure the bottom contours ahead of the ship. In either instance, the effective range of the bottom contour measurement is too short to allow sufficient distance for the ship to make evasive maneuvers around unexpected underwater hazards. For above-ground hazards, some ships may be equipped with a radar system, but radar systems are limited to line-of-sight, and are not effective to "see" around points, bluffs, or man-made structures, which may be required when navigating in fjords, rivers, bays, rugged coastlines, or the like. Other surface objects and debris may be avoided by careful observation by the ship's crew, but many hazards, such as currents, eddies, and gusting wind are difficult to detect with the unaided eye, and thus are not noticed until it is too late for the ship to make an evasive maneuver.

In some areas, international laws place regulations on ships to comply with low speed requirements in certain areas, for example in seasons and areas known for whale feeding and breeding. However, such restrictions do not always prevent ships from colliding with the whales. In some cases, ships do not comply with the speed requirements because of operational limits such as maneuverability, engine, or time constraints, thus placing the ships and wildlife at risk for collisions.

Thus, a need exists for a navigation and hazard avoidance system that addresses the above issues.

BRIEF DESCRIPTION

In one aspect, an unmanned aquatic surface vehicle for detecting and locating hazards is disclosed. The vehicle includes a propulsion system configured to impart a propulsive force to the vehicle and a steering system configured to impart a change in the direction of travel of the vehicle. A hazard detection system is configured to detect and locate at least one of a subsurface, surface or above-water hazard. A communications device configured to transmit hazard data associated with a detected hazard to a remote receiver.

In another aspect, a method of navigating a command vessel in a waterway using an unmanned aquatic surface vehicle is disclosed. The method includes commanding the aquatic surface vehicle to follow an intended route of the command vessel. A communication from the unmanned aquatic surface vehicle including hazard data is received by the command vehicle. Navigation data of the command vessel is updated based upon the received hazard data.

In yet another aspect, a system for detecting hazards is disclosed. The system includes an aquatic surface vehicle having a controllable propulsion system and a steering system. A hazard detection system is coupled to the aquatic surface vehicle and configured to detect at least one of a subsurface, surface or above-water hazard. A communications system is coupled to the aquatic surface vehicle and configured to transmit hazard data associated with a detected hazard to a remote receiver. A power source provides power to the propulsion system, the steering system, the hazard detection system, and the communications system.

DETAILED DESCRIPTION

Figure 1:
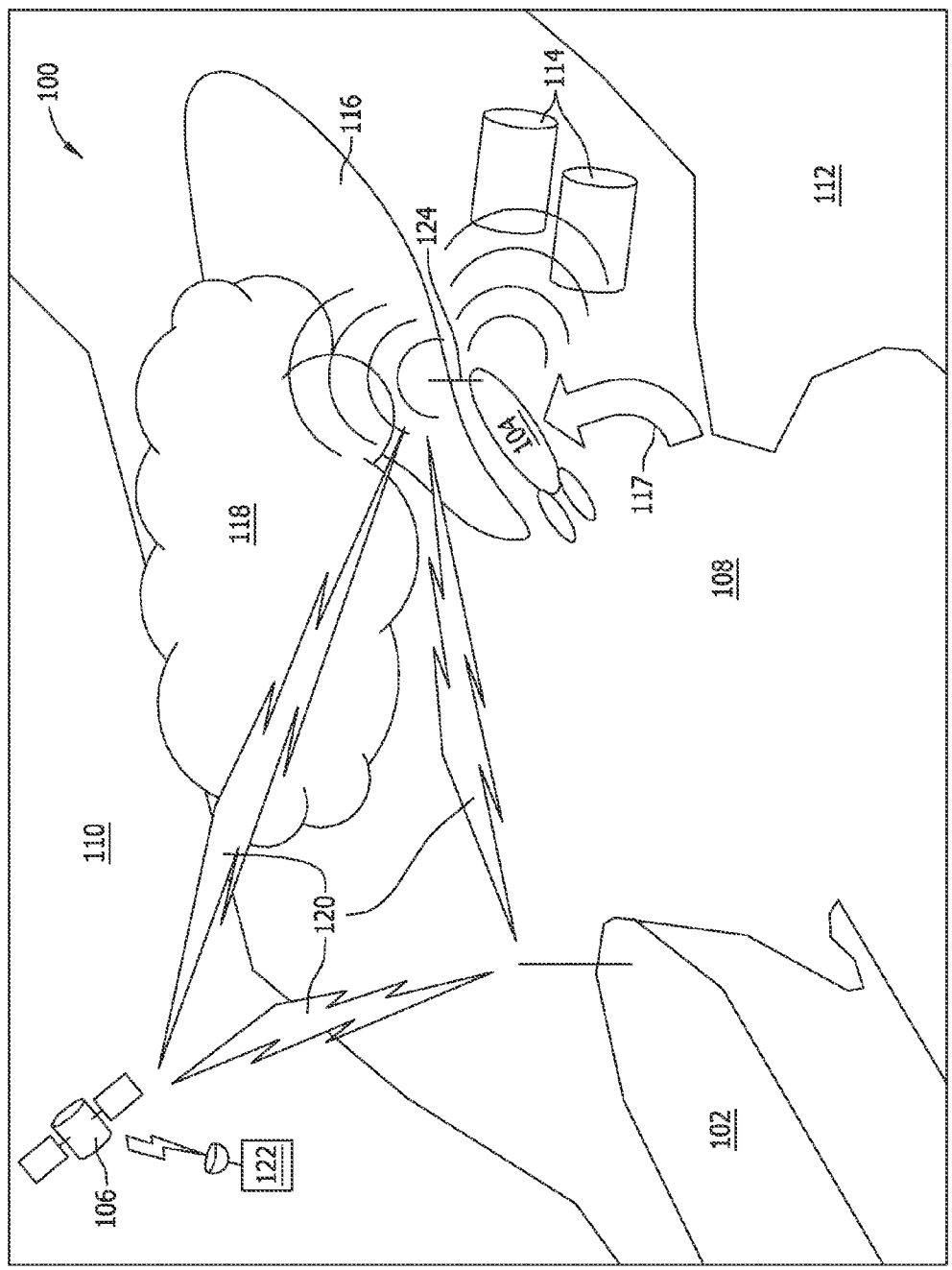
FIG. 1 illustrates an implementation of a system for detecting hazards.

FIG. 1 illustrates an implementation of a system 100 for detecting and locating hazards. As used herein, the terms hazard, obstacle, and obstruction may be used interchangeably. In the illustrated implementation, the system 100 includes a command vessel 102 and an unmanned aquatic surface vehicle 104. The unmanned aquatic surface vehicle 104 may be referred to as a ship course obstruction warning transport (SCOWT). In one implementation, a signal relay device 106, such as a satellite, radio tower or the like may be part of the system 100 to facilitate communications. In another implementation, one or more of the command vessel 102, unmanned aquatic surface vehicle 104 and signal relay device 106 are in communication with a external data center 122 for supplying navigation data. One or more of the command vessel 102, unmanned aquatic surface vehicle 104, signal relay device 106 and external data center 122 are in communication by way of communication channels 120. As used herein, a communication channel 120 is any form of wired or wireless data communication.

The command vessel 102 may be a cruise ship, cargo ship, military vessel, other large waterborne vessel or the like. The command vessel 102 is shown navigating in a waterway 108. As used herein, the term waterway refers to any body of water capable of being navigated by the command vessel 102 or the unmanned aquatic surface vehicle 104, such as a river, lake, sea, ocean, canal, stream or the like. As illustrated, the waterway 108 is defined by landmasses 110 and 112. One or more hazards 114 may be present in the waterway 108. The hazards 114 may be any hazard present in the waterway including surface or above-surface hazards. Some examples of surface and above-surface hazards include floating or partially floating debris, icebergs, buoys, piers, islands or the like. Other hazards, such as subsurface hazard 116 may also be present in the waterway 108. Subsurface hazard 116 may be, for example, a sandbar, reef, subsurface mines, marine wildlife, sunken debris or the like. The waterway 108 may also be affected by visual impairments 118, such as fog, haze, smoke or the like, that reduce the ability of the crew to see upstream. Hazards may also be local surface and subsurface currents or eddies or gusting wind, represented by arrow 117, that can push the command vessel 102 off course and into hazards 114 and/or 116.

Figure 2:
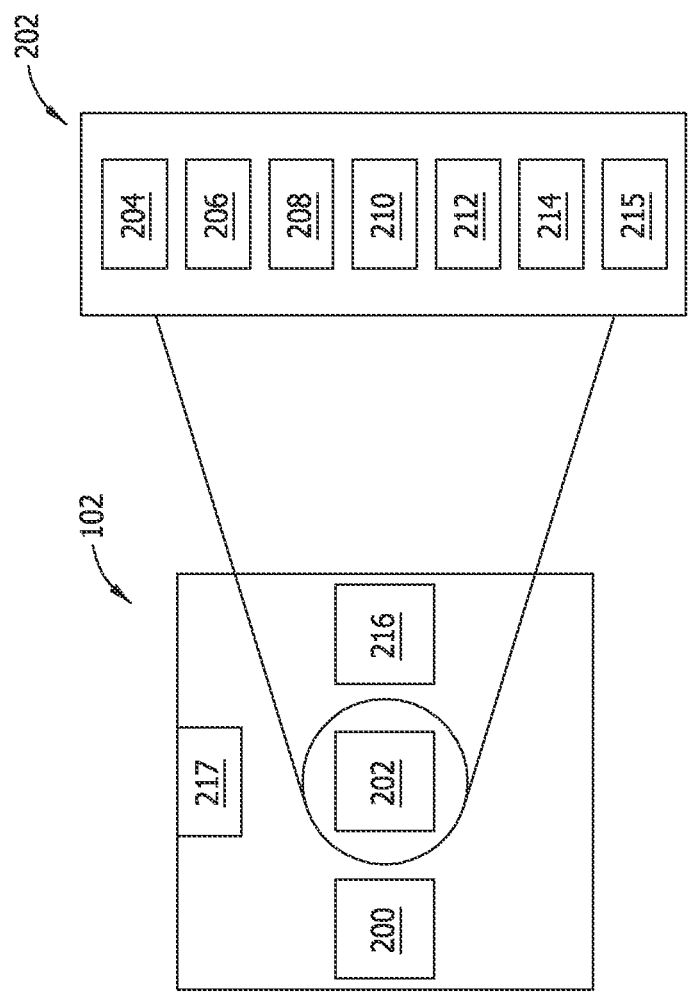
FIG. 2 is a schematic view of a command vessel of the system of FIG. 1.

Referring now to FIG. 2, a schematic illustration of command vessel 102 is provided, which is propelled by a propulsion system 200. In support of the unmanned aquatic surface vehicle 104, the command vessel 102 includes a control station 202, a deployment system 216, and a storage and maintenance facility 217. The control station 202 includes one or more sub-systems, such as a navigation system 204, a control system 206, an alert system 208, a communication system 210, electronic data storage system 212, a user interface 214, and a display 215. Each of the sub-systems may be interconnected such that the sub-systems are capable of communication between one another by way of wired or wireless data transfer. In some implementations, the deployment system 216 stows or supports the unmanned aquatic surface vehicle 104 therein until it is deployed from the command vessel 102. The deployment system 216 also may include a capability to recover the unmanned aquatic surface vehicle 104. The storage and maintenance facility 217 may be located with the deployment system 216, or in a separate location. The storage and maintenance facility may be used for long term storage, or performing maintenance on the unmanned aquatic surface vehicle 104. As such, the storage and maintenance facility 217 may be configured to allow maintenance personnel to access all sides of the unmanned aquatic surface vehicle 104, by utilizing a lift or hoist or the like.

Figure 3:
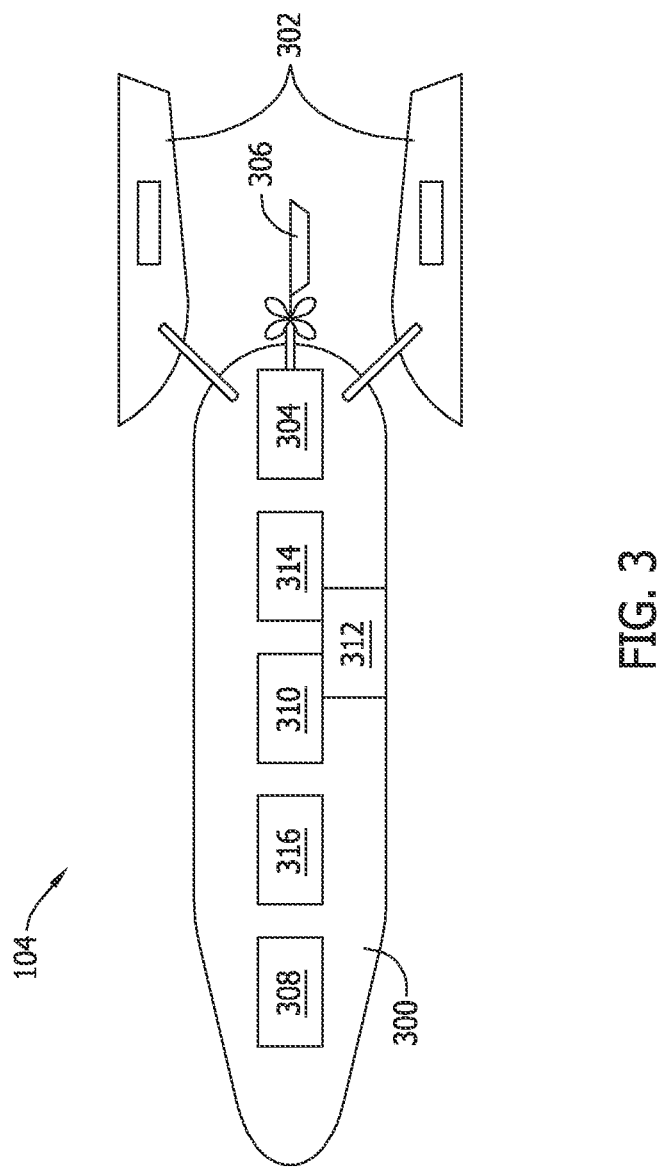
FIG. 3 is a schematic view of an unmanned aquatic surface vehicle of the system of FIG. 1.

Referring now to FIG. 3, a schematic illustration of the unmanned aquatic surface vehicle 104 is provided. The unmanned aquatic surface vehicle 104 is generally in the form of a small boat or watercraft 300. Some examples of suitable watercraft include kayaks, canoes, personal watercraft, WAM-V® (Marine Advanced Research Inc., California, USA), rigid inflatable boats (RIBs), and the like. In some implementations, the watercraft 300 includes one or more outboard stability devices 302, such as pontoons, wherein other vehicle components may be located. In the illustrated implementation, the unmanned aquatic surface vehicle 104 includes a propulsion system 304 configured to impart a propulsive force to the vehicle to move the vehicle in a desired direction. A steering system 306, for example a rudder or jet nozzle or the like, is coupled to the aquatic surface vehicle 104 and is configured to impart a change in the direction of travel of the vehicle. The propulsion system 304 and the steering system 306 may also be achieved with multiple propulsion devices, which in some implementations may be installed in the outboard stability devices 302. For example, two propulsion devices may be installed (one in each of the stability devices 302) to use differential propulsion for steering as well as propulsion. A hazard detection system 308 is included in the unmanned aquatic surface vehicle, which is configured to detect the subsurface hazards 116 (FIG. 1), surface or above-water hazards 114 (FIG. 1). The unmanned aquatic surface vehicle 104 also includes a communications device 310 configured to transmit hazard data associated with a detected hazard to a remote receiver located on the command vessel 102. An onboard navigation system 316 is configured to detect the location, direction, and motion of the vehicle using appropriate onboard sensors such as a GPS receiver, heading sensor, current sensor, and an inertial navigation system. The navigation system 316 is in communication with the propulsion system 304 and the steering system 306. The navigation system 316 is also configured to use navigation data, either preprogrammed navigation data stored in the navigation system 316 or navigation data received from the command vessel 102. The navigation data may be used alone or together with location, direction, and motion data provided by onboard sensors, to control the amount of propulsive force imparted to the vehicle by the propulsion system 304 and the change in direction of travel of the vehicle imparted by the steering system 306. A power source 312, such as an energy storage device (e.g., a battery, fuel tank, or fuel cell), is included in the unmanned aquatic surface vehicle 104 to provide power to the propulsion system 304, steering system 306, hazard detection system 308, navigation system 316 and the communications system 310. In some embodiments, a power regenerating system 314 may be used to regenerate power to the power source 312. For example, the power regenerating system 314 may include one or more solar cells that convert solar energy into electrical energy to be stored in the power source 312.

Each of the components of the unmanned aquatic surface vehicle 104 may be housed within an interior compartment of the vehicle. For example, one or more of the propulsion system 304, steering system 306, hazard detection system 308 and the communications system 310 may be housed within the watercraft 304, such that the housed components are not exposed to water. As such, the unmanned aquatic surface vehicle 104 may be water-tight or substantially water-tight.

Figure 4:
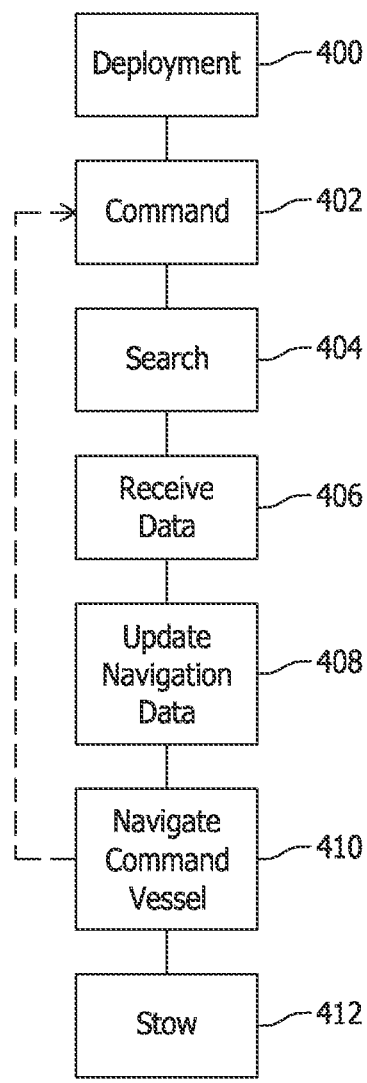
FIG. 4 is a block diagram of an implementation of navigating a command vessel in a waterway using an unmanned aquatic surface vehicle.

In use, the system 100 for detecting hazards is operable to detect and locate hazards for improved navigation of the command vessel 102. In one implementation, the command vessel 102 stores the unmanned aquatic surface vehicle 104 in its deployment system 216. At a desired location, an operator of the command vessel 102 initiates deployment of the unmanned aquatic surface vehicle 104 from the command vessel 102. For example, when the command vessel nears unknown or uncharted waterways, narrow waterways, dangerous waterways, waterways known for high traffic of ships or protected marine wildlife, or the like, the operator may deploy the unmanned aquatic surface vehicle 104. Once deployed, the unmanned aquatic surface vehicle 104 is configured to float, such that it remains at least partially above the waterline of the waterway. Upon deployment 400 (FIG. 4), the unmanned aquatic surface vehicle 104 may be autonomous, such that no further control actions are required by the command vessel, or remotely controlled, such that the command vessel remotely provides navigation data to the navigation system 316, or by issuing direct commands to the propulsion system 304 and steering system 306, to control the unmanned aquatic surface vehicle 104.

At step 402, the unmanned aquatic surface vehicle 104 is commanded to follow an intended route of the command vessel 102. In one embodiment, the operator of the command vessel 102 transmits navigation data from a remote transmitter, which may be part of the communication system 210. The transmitted navigation data is received at the unmanned aquatic surface vehicle 104 by a receiver or transceiver 124 in the corresponding communication system 310 onboard the unmanned aquatic surface vehicle 104, and provided to the navigation system 316 thereon. The navigation data includes instructions for controlling the propulsion system 304 and the steering system 306 of the unmanned aquatic surface vehicle 104. The instructions may be in the form of GPS coordinates, waypoints, or other location or direction and motion data of the intended route that provides sufficient information to the unmanned aquatic surface vehicle 104 to navigate to such locations, which may include the intended route of the command vessel 102. The propulsion system 304 of the unmanned aquatic surface vehicle 104 thus propels the vehicle while the steering system 306 adjusts directional control of the vehicle, using the onboard sensors in the navigation system 316 to detect location, direction and motion of the vehicle.

As the unmanned aquatic surface vehicle 104 follows the intended route of the command vessel 102, a search operation 404 is conducted using the hazard detection system 308. In some implementations, the unmanned aquatic surface vehicle 104 may be commanded to reach a predetermined distance ahead of the command vessel 102 before initiating the search operation 404. The search operation 404 utilizes one or more sensors of the hazard detection system 308 to scan for water depth, bathymetric contours, submerged hazards, floating debris, icebergs, buoys, pilings, other vessels, and local water currents or eddies, which are more generally referred to as surface or above-water hazards 114 and subsurface hazards 116 (FIG. 1). The sensors may include one or more of an echo sounder, an altimeter, a navigation sensor such as a GPS receiver or an inertial navigation system, an automatic identification system (AIS) receiver, a sonar transceiver (forward scanning and/or side scanning), a current sensor, a salinity sensor, a water temperature sensor, a range sensor, a proximity sensor, a radar, a motion sensor, an anemometer, a barometer, and a video camera. In one embodiment, the sensors of the hazard detection system include at least an echo sounder, a proximity sensor, a GPS receiver, a sidescan sonar, a radar and an AIS receiver. The searching operation 404 may be continuous or intermittent during navigation of the unmanned aquatic surface vehicle 104. In some embodiments, the search operation 404 may include additional steps of storing and/or processing data received by the sensors, for example to generate hazard data. Any detected hazard may be processed onboard the unmanned surface vehicle 104 into hazard data, which may contain data related to the size, location, type, or motion of the detected hazard. It is noted that the hazard detection system 308 may include a video capture device, and transmit video data as all or part of the hazard data. In some implementations, the navigation system 316 of unmanned aquatic surface vehicle 104 is programmed to automatically avoid hazards. In such implementations, upon detection of a hazard, the navigation system 316 of the unmanned aquatic surface vehicle commands the propulsion system 304 and/or the steering system 306 to change the direction or speed of the vehicle to make a maneuver to avoid the hazard. The hazard data is transmitted via the communication system 310, which may be a transmitter or transceiver, to the remote receiver located at the command vessel 102. In some implementations, the hazard data may be first transmitted to the relay device 106, which then relays the hazard data to the command vessel 102 to increase the distance the hazard data may be transmitted.

In some implementations, if the detected hazard meets or exceeds a predefined condition or threshold value, the unmanned aquatic surface vehicle 104 may transmit a warning, or alert signal to the command vessel 102. For example, the command vessel may have one or more performance constraints, such as waterway width, waterway depth, waterway height or the like. If a detected hazard affects one of the performance constraints (e.g., the waterway depth is detected to be too shallow), the unmanned aquatic surface vehicle may transmit a warning signal to the command vessel 102 to alert the operator of the affected performance constraint (e.g., an alert that the waterway is too shallow for the command vessel to navigate). The warning signal may be included with the hazard data, or transmitted in a separate communication to the command vessel 102, which may ultimately initiate a visual or audible warning at alert system 208 to alert an operator of the command vessel 102 that an evasive maneuver should be performed to avoid the hazard. The alert may also include recommendations to the operator of preferred evasive maneuvers that accommodate the command vessel's 102 performance constraints.

At step 406, the command vessel 102 receives the hazard data (and/or the warning signal). The hazard data may then be viewed by the command vessel 102 operator on the display 215 or user interface 214, and updated 408 into the navigation data of the navigation system, 204 of the command vessel 102. For example, upon receiving the hazard data at the command vessel 102 from the unmanned aquatic surface vehicle 104, the hazard data may be used to modify the intended route of the command vehicle 102. For example, if the hazard data indicates that the waterway 108 contains a potentially dangerous condition or an impassable hazard, the command vessel 102 may change its intended route to avoid the detected hazard. Accordingly, the hazard data may provide the command vessel 102 with advanced warning of the conditions of the waterway 108, such that the command vessel 102 has sufficient time to make an evasive maneuver (e.g., turn, reduce speed or stop). After updating the navigation data of the command vessel 102, the command vessel 102 is navigated accordingly.

At any time during the deployment of the unmanned aquatic surface vehicle 104, the command vessel may command 402 the unmanned aquatic surface vehicle 104.

In some implementations, the unmanned aquatic surface vehicle 104 may be commanded at any time after deployment to return to the command vessel 102 for stowage. For example, once the command vessel has reached safe open waters, its port of destination or other desired location, the command vessel 102 may transmit a command to the unmanned aquatic surface vehicle 104 to initiate the unmanned aquatic surface vehicle 104 to return to the command vessel 102 or to a desired recovery point. Once the unmanned aquatic surface vehicle 104 is recovered, it may be stowed 412 in the deployment system 216 or otherwise brought aboard the command vessel 102, for example to storage and maintenance facility 217.

In another implementation, the unmanned aquatic surface vehicle 104 is autonomous. In this implementation, the command vessel 102 is not required to transmit commands to the unmanned aquatic surface vehicle 104 after deployment. Rather, in this implementation, the unmanned aquatic surface vehicle 104 is pre-programmed with a complete or substantially complete set of commands or instructions for navigating, searching, avoiding hazards, self-rescue, and or returning to the command vessel 102 or desired recovery point.

Figure 5:
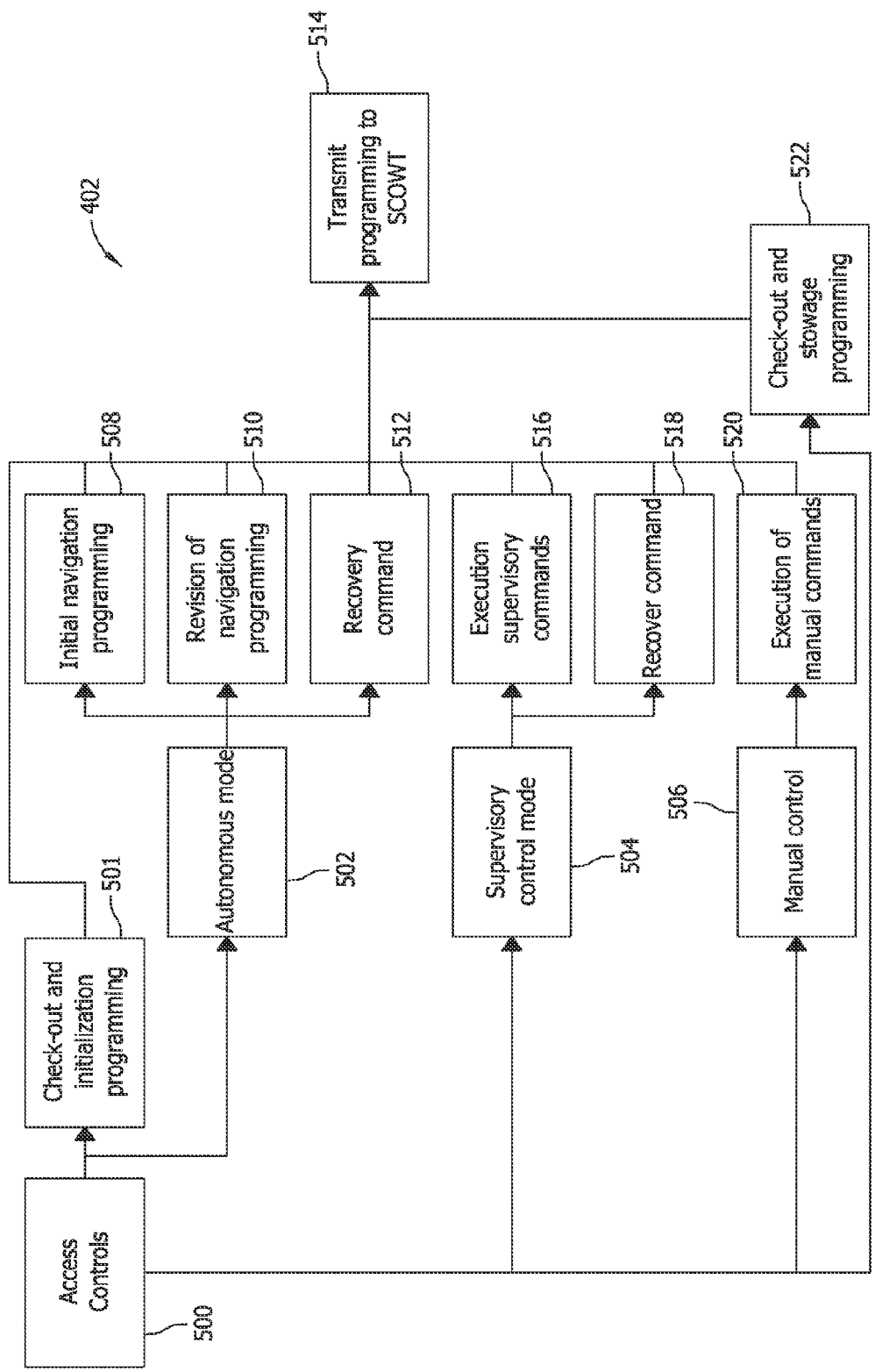
FIG. 5 is a block diagram of further details of an implementation of the control operation of the unmanned aquatic surface vehicle.

With reference to FIG. 5, further detail of implementations of command operation 402 is provided. During the command operation 402, an operator accesses the controls 500 in the control station 202. There are three general modes of operation for the unmanned aquatic surface vehicle 104, including autonomous mode 502, supervisory control mode 504 and manual control mode 506. The operator may select any of such modes, depending on the operating environment of the system 100.

In the autonomous mode 502, the unmanned aquatic vehicle 104 is initially programmed 508 with navigation data sufficient to conduct its search, as described above. However, in some instances, an operator may need or want to revise the initial navigation programming 508, for example to command the unmanned aquatic surface vehicle 104 to a detour location for searching. As such, the operator transmits 514 a revised navigation program 510 to the unmanned aquatic vehicle 104, which provides sufficient navigation data to allow the unmanned aquatic surface vehicle to maneuver to the detour location and conduct its search. The operator may initiate a recovery command 512, which may be transmitted 514 to the unmanned aquatic surface vehicle 104 to initiate the unmanned aquatic surface vehicle 104 to return to the command vessel 102, as discussed above.

In the supervisory control mode 504, the unmanned aquatic surface vehicle 104 is initially programmed with navigation data sufficient to conduct at least a portion of its search. For example, the in the supervisory control mode, the unmanned aquatic surface vehicle 104 is substantially autonomous, but the operator transmits 514 supervisory commands 516 for execution by the unmanned aquatic surface vehicle 104. For example, a supervisory command may be a command to initiate a secondary, or additional, search of a particular location or a command to utilize an additional sensor to conduct the search operation 404. At any time desired during the operation of the unmanned aquatic surface vehicle 104, the operator may initiate a recovery command 518, which may be transmitted 514 to the unmanned aquatic surface vehicle 104 to initiate the unmanned aquatic surface vehicle 104 to return to the command vessel 102, as discussed above.

In yet another implementation, the unmanned aquatic surface vehicle may be placed in a manual control mode 506. In this mode, the operator is capable of controlling the unmanned aquatic surface vehicle 104 real-time. For example, in this mode, the operator may transmit 514 manual commands 520 to the unmanned aquatic surface vehicle on a frequent basis to substantially control all of the operations of the vehicle in real time. For example, the manual commands 520 may include one or more commands to control the unmanned aquatic surface vehicle 104 to change speed, change direction, utilize one or more sensors, or initiate the unmanned aquatic surface vehicle 104 to return to the command vessel 102, as discussed above. In manual mode, it may be preferable that the unmanned aquatic surface vehicle include a video camera as one of its sensors, and transmit a live feed of video back to the operator, to facilitate control of the vehicle.

Other operations, such as check out and initialization programming 501 may be performed at the time the unmanned aquatic surface vehicle 104 is being deployed. Such programming 501 may be used to turn on, or activate, or sync the vehicle's communications systems with the control station 202. A check out and stowage programming 522 may be transmitted 514 to the unmanned aquatic surface vehicle at a time the unmanned surface vehicle is transferred to the storage and maintenance facility 217. The stowage programming 522 may include programming to test or self check one or more components of the unmanned aquatic surface vehicle 104.

Figure 6:
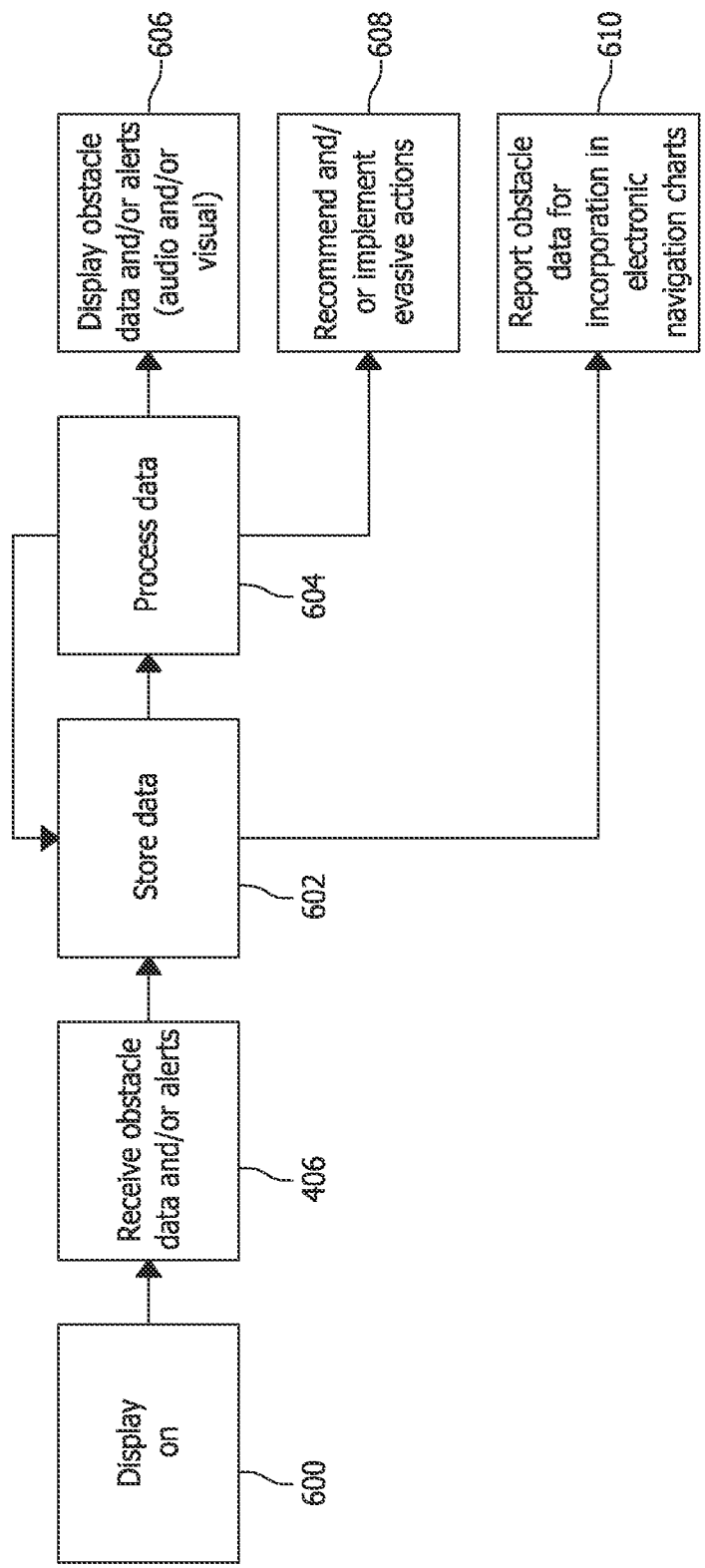
FIG. 6 is a block diagram of further details of an implementation of the system for providing information about hazards, alerts, and evasive action.

With reference to FIG. 6, further detail of the receive data 406 and update navigation data 408 operations are described. The display 215 is turned on at step 600. However, in some implementations, the display 215 may already be on, and an operator need not turn on the display if already on. At step 406, the command vessel 102 receives the hazard data (and/or the warning signal) from the unmanned aquatic surface vehicle 104. The hazard data may then be stored 602 in electronic data storage system 212. The received hazard data may then be analyzed, formatted, encrypted, compressed, or otherwise processed 604 into a usable data format. At this time, the processed data 604 may then be stored 602 in the electronic data storage system 212 if desired by the operator. The processed data is then displayed 606 to the operator on the display 215, which may provide the operator with an audio or visual alert on the alert system 208, location data of the hazard or other information related to the detected hazard(s). At step 604, the data may be processed such that the operator is alerted to take or implement an evasive action 608 on display 215 or alert system 208. In yet another implementation, the data may be used or configured to update 610 a navigation chart or electronic navigation chart display and information system (ECDIS).

One or more of the navigation system 204, control system 206, alert system 208, communication system 210, electronic data storage system 212, user interface 214, hazard detection system 308, communication device 310 and navigation 316 may include a computer processor or processing device (not shown). The processor is generally any piece of hardware that is capable of processing information such as, for example, data, computer-readable program code, instructions or the like (generally "computer programs," e.g., software, firmware, etc.), and/or other suitable electronic information. For example, the processor may be configured to execute computer programs or commands, which may be stored onboard the processor or otherwise stored in an associated memory (not shown). In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. As used herein, electronic or computer memory is generally any piece of hardware that is capable of storing information such as data, computer programs and/or other suitable information either on a temporary basis or a permanent basis. In one example, the memory may be configured to store various information in one or more databases. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk read-only-memory (CD-ROM), compact disk read/write memory (CD-R/W), digital video disk memory (DVD), or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable media, as described herein, may generally refer to a computer-readable storage medium or computer-readable transmission medium.

In addition to the memory, the processor may also, but need not be, connected to one or more interfaces for displaying, transmitting and/or receiving information. These interfaces may include one or more communications interfaces (none shown) and/or one or more user interfaces. The communications interface may be configured to transmit and/or receive information, such as to and/or from other apparatus(es), network(s) or the like. The communications interface may be configured to transmit and/or receive information by physical (by wire) and/or wireless communications links. Examples of suitable communication interfaces include a network interface controller (NIC), wireless NIC (WNIC) or the like.

The user interfaces may include a display and/or one or more user input interfaces. The display may be configured to present or otherwise display information to a user, suitable examples of which include a liquid crystal display (LCD), light-emitting diode display (LED), plasma display panel (PDP) or the like. The user input interfaces may be by wire or wireless transmission, and may be configured to receive information from a user, such as for processing, storage, and/or display. Suitable examples of user input interfaces include a microphone, image or video capture device, keyboard or keypad, joystick, touch-sensitive surface (separate from or integrated into a touch screen), biometric sensor or the like. The user interfaces may further include one or more interfaces for communicating with peripherals such as printers, scanners or the like.

As indicated above, program code instructions may be stored in memory, and executed by a processor, to implement functions of the system, apparatuses and their respective elements described herein. As will be appreciated, any suitable program code instructions may be loaded onto a computer or other programmable apparatus, e.g., from a computer-readable storage medium to produce a particular machine, such that the particular machine becomes a means for implementing the functions specified herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Implementations of the system 100 thus may provide large ships or vessels with advanced warning of hazards by use of the unmanned aquatic surface vehicle 104. As such, potential damage to the large ship and the environment may be avoided.

This written description uses examples to disclose the implementations, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An unmanned aquatic surface vehicle, comprising:
   a propulsion system configured to impart a propulsive force to the vehicle;
   a steering system configured to impart a change in the direction of travel of the vehicle; and
   a hazard detection system configured to:
   detect and locate at least one of a subsurface, surface or above-water hazard;
   determine whether the detected at least one subsurface, surface or above-water hazard affects a performance constraint of a command vessel; and
   transmit a warning signal to the command vessel in response to a determination that the detected at least one subsurface, surface or above-water hazard affects a performance constraint of the command vessel.

2. The unmanned aquatic surface vehicle according to claim 1 further comprising a navigation system in communication with the propulsion system and the steering system, the navigation system configured to use navigation data to control the amount of propulsive force imparted to the vehicle by the propulsion system and the change in direction of travel of the vehicle imparted by the steering system.

3. The unmanned aquatic surface vehicle according to claim 2 further comprising a receiver configured to receive a control signal from a remote transmitter, wherein the receiver is in communication with the navigation system and provides the navigation data to the navigation system.

4. The unmanned aquatic surface vehicle according to claim 2 wherein the navigation system is programmed with the navigation data.

5. The unmanned aquatic surface vehicle according to claim 1 wherein the hazard detection system includes at least one sensor capable of detecting at least one of location, water depth, bathymetric contours, submerged hazards, floating debris, icebergs, buoys, pilings, other vessels, local water currents or eddies, and wind.

6. The unmanned aquatic surface vehicle according to claim 2, wherein the navigation system is programmed to maintain the vehicle a predetermined distance ahead of the command vessel.

7. The unmanned aquatic surface vehicle according to claim 2 wherein the hazard detection system is further configured to transmit recommended evasive maneuvers to the command vessel.

8. The unmanned aquatic surface vehicle according to claim 1 wherein the performance constraint is one of a waterway width, waterway depth, and waterway height.

9. The unmanned aquatic surface vehicle according to claim 1 wherein the hazard detection system is further configured to transmit location data of the detected hazard.

10. The unmanned aquatic surface vehicle according to claim 1 wherein the hazard detection system includes at least one of a navigation sensor, an echo sounder, a sonar transceiver, a current sensor, a salinity sensor, a water temperature sensor, a range sensor, a proximity sensor, a radar, an anemometer, and a video camera.

11. A method of navigating a command vessel in a waterway using an unmanned aquatic surface vehicle, comprising:
commanding the aquatic surface vehicle to follow an intended route of the command vessel;
receiving a communication from the unmanned aquatic surface vehicle indicating that at least one subsurface, surface or above-water hazard detected by the unmanned aquatic surface vehicle affects a performance constraint of the command vessel; and
modifying the intended route of travel of the command vessel in response to the indication that the at least one subsurface, surface or above-water hazard affects the performance constraint.

12. The method according to claim 11 wherein the performance constraint is one of a waterway width, waterway depth, and waterway height.

13. The method according to claim 11 further comprising commanding the unmanned aquatic surface vehicle to change speed or direction.

14. The method according to claim 11 wherein the communication includes data related to at least one of location, water depth, bathymetric contours, submerged hazards, floating debris, icebergs, buoys, pilings, other vessels, and local water currents, eddies, and wind.

15. A system for detecting and locating hazards, comprising:
an aquatic surface vehicle including a controllable propulsion system and a steering system;
a hazard detection system coupled to the aquatic surface vehicle configured to:
detect at least one of a subsurface, surface or above-water hazard; and
determine whether the detected at least one subsurface, surface or above-water hazard affects a performance constraint of a command vessel;
a communications system coupled to the aquatic surface vehicle configured to transmit a warning signal to the command vessel in response to a determination that the detected at least one subsurface, surface or above-water hazard affects a performance constraint of a command vessel; and
a power system for providing power to the propulsion system, the steering system the hazard detection system and the communications system.

16. The system according to claim 15, wherein the power source comprises an electrical energy storage device.

17. The system according to claim 16, further comprising a power regenerating device that regenerates the electrical energy.

18. The system according to claim 15 wherein the hazard detection system includes at least one of a navigation sensor, an echo sounder, a sonar transceiver, a current sensor, a salinity sensor, a water temperature sensor, a range sensor, a proximity sensor, a radar, an anemometer, and a video camera.

19. The system according to claim 15 wherein the performance constraint is one of a waterway width, waterway depth, and waterway height.

* * * * *